US011683361B1

(12) United States Patent
Hansen et al.

(10) Patent No.: US 11,683,361 B1
(45) Date of Patent: Jun. 20, 2023

(54) SYSTEMS AND METHODS FOR ASYNCHRONOUS TRANSFER OF USER-PROVIDED INFORMATION UPON USER-PROVIDED PERMISSION

(71) Applicant: Permissionize LLC, Boulder, CO (US)

(72) Inventors: Shannon Hansen, San Diego, CA (US); Thomas Cutshall, Boulder, CO (US)

(73) Assignee: Permissionize LLC, Boulder, CO (US)

( * ) Notice: Subject to any disclaimer, the term of this patent is extended or adjusted under 35 U.S.C. 154(b) by 0 days.

(21) Appl. No.: 17/945,668

(22) Filed: Sep. 15, 2022

(51) Int. Cl.
  *G06F 15/16* (2006.01)
  *H04L 67/02* (2022.01)
  *G06F 16/27* (2019.01)

(52) U.S. Cl.
  CPC ............ *H04L 67/02* (2013.01); *G06F 16/273* (2019.01)

(58) Field of Classification Search
  None
  See application file for complete search history.

(56) References Cited

U.S. PATENT DOCUMENTS

| 10,304,084 | B2 | 5/2019 | Napchi | |
|---|---|---|---|---|
| 10,701,030 | B2 | 6/2020 | Napchi | |
| 10,892,968 | B2 | 1/2021 | Toksoz | |
| 11,190,563 | B2 | 11/2021 | Sei | |
| 2015/0088612 | A1 | 3/2015 | Palan | |
| 2016/0125453 | A1 | 5/2016 | Shukla | |
| 2018/0137295 | A1* | 5/2018 | Sharma | G06F 21/606 |
| 2019/0318122 | A1* | 10/2019 | Hockey | H04L 63/0853 |
| 2021/0081947 | A1* | 3/2021 | Hockey | G06F 21/62 |
| 2023/0017196 | A1* | 1/2023 | Jain | H04L 67/53 |
| 2023/0116961 | A1* | 4/2023 | Braathen | G06Q 20/102 |
| | | | | 705/40 |

* cited by examiner

*Primary Examiner* — Phuoc H Nguyen
(74) *Attorney, Agent, or Firm* — Esplin & Associates, PC

(57) ABSTRACT

Systems and methods to asynchronously transfer user-provided information upon user-provided permissions are disclosed. Exemplary implementations may receive a user-initiated request for one or more webpages from a user associated with a client computing platform; transfer a set of information to the client computing platform, wherein the set of information is usable to generate one or more presentations of the one or more webpages on the client computing platform; receive, from the client computing platform, user-provided information, wherein the user-provided information is based on a first item of user-provided personal information and on a second item of user-provided personal information that have been collected locally through the one or more presentations on the client computing platform, and wherein server-side receipt of the user-provided information occurs subsequent to the user providing permission for the transfer of the user-provided information; and/or other steps.

20 Claims, 5 Drawing Sheets

SYSTEMS AND METHODS FOR ASYNCHRONOUS TRANSFER OF USER-PROVIDED INFORMATION UPON USER-PROVIDED PERMISSION

FIELD OF THE DISCLOSURE

The present disclosure relates to systems and methods to control the transfer of user-provided information based on receiving permission from a user for such a transfer.

BACKGROUND

People entering (personal) information in a field or form on a website is known. Providers of online services asking for permission to use personal information is known, e.g., prior to sending notifications and/or other information to users.

SUMMARY

One aspect of the present disclosure relates to a system configured to asynchronously transfer user-provided information upon user-provided permissions. The system may include one or more servers including one or more processors. The system may be configured to receive a user-initiated request for one or more webpages from a user associated with a client computing platform. The system may be configured to transfer a set of information to the client computing platform. The set of information may be usable to generate one or more presentations of the one or more webpages on the client computing platform. The system may be configured to receive, from the client computing platform, user-provided information. The user-provided information may be based on a first item of user-provided personal information and on a second item of user-provided personal information that have been collected locally through the one or more presentations on the client computing platform. Server-side receipt of the user-provided information may occur subsequent to the user providing permission for the transfer of the user-provided information. The system may be configured to perform other steps.

Another aspect of the present disclosure related to a method of asynchronously transferring user-provided information upon user-provided permission. The method may include receiving a user-initiated request for one or more webpages from a user associated with a client computing platform. The method may include transferring a set of information to the client computing platform. The set of information may be usable to generate one or more presentations of the one or more webpages on the client computing platform. The method may include receiving, from the client computing platform, user-provided information. The user-provided information may be based on a first item of user-provided personal information and on a second item of user-provided personal information that have been collected locally through the one or more presentations on the client computing platform. Server-side receipt of the user-provided information may occur subsequent to the user providing permission for the transfer of the user-provided information. The method may include other steps.

As used herein, any association (or relation, or reflection, or indication, or correspondency, or correlation) involving servers, processors, client computing platforms, users, requests, webpages, presentations, permissions, transfers, interfaces, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
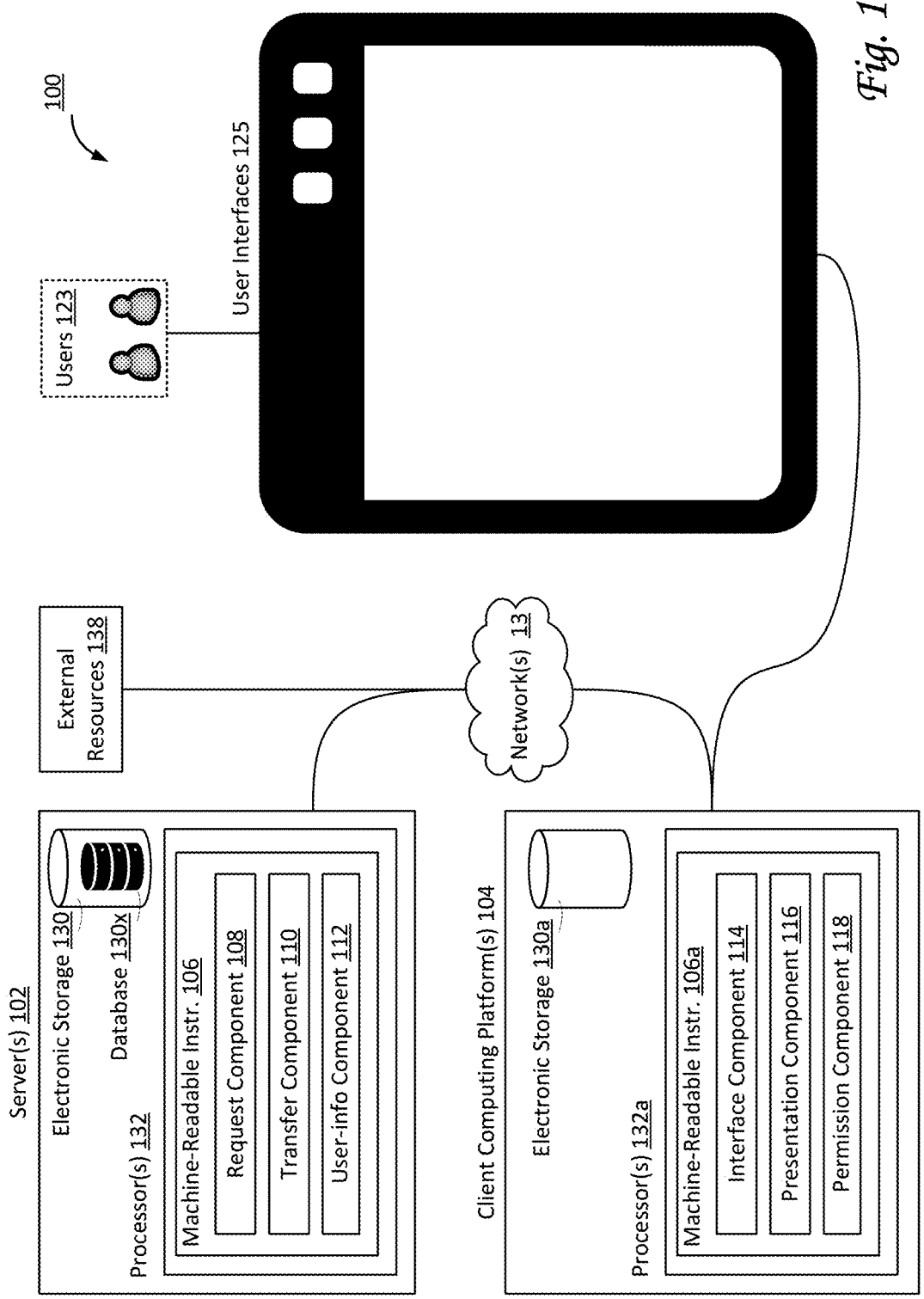
FIG. 1 illustrates a system configured to asynchronously transfer user-provided information upon user-provided permissions, in accordance with one or more implementations.

FIG. 1 illustrates a system 100 configured to asynchronously transfer user-provided information upon user-provided permissions, in accordance with one or more implementations. As a preliminary and non-limiting example, by virtue of the systems and methods described in this disclosure, user-provided (personal) information may be gathered on a local client computing platform without being transferred to a server, until and unless the user provides permission for such a transfer. The first way the transfer is asynchronous is based on the separation in time between the user entering particular user-provided information and the subsequent transfer, if permitted, to a server. The second way the transfer may be asynchronous is based on using an asynchronous HyperText Transfer Protocol (HTTP) instruction to initiate the transfer, since this type of instruction does not require a response from one or more servers (and, accordingly, the local client computing platform does not need to wait for a response from the server to this type of instruction). Additionally, by virtue of the systems and methods described in this disclosure, the one or more servers may manage, host, and/or otherwise provide online services through one or more webpages in a manner that ensures that user-provided (personal) information from users (in other words, submitted personal information) has been received with the permission of the users. In some implementations, permission by an individual user may include permission to use the submitted personal information and/or permission to notify and/or otherwise contact the individual user.

System 100 may include one or more servers 102, one or more client computing platforms 104, user interface(s) 125, external resource(s) 138, and/or other components. Users 123 (also referred to as users) may include one or more of a first user, a second user, and/or other users. Users 123 may include users who use server(s) 102, directly or indirectly. As used in descriptions herein, any use of the term "user" may refer to user(s) 123, unless indicated otherwise. Individual users may be associated with individual client computing platforms 104, and/or vice versa. As used herein, "local" refers to the client-side or user-side in system 100, whereas "remote" or "server-side" refers to the side of servers 102 in system 100.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, system 100 may be configured to communicate with one or more of server(s) 102, users 123, and/or other entities and/or components, e.g., through one or more networks 13.

Server(s) 102 may include electronic storage 130, (hardware) processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a request component 108, a transfer component 110, a user-info component 112, an interface component 114, a presentation component 116, a permission component 118, and/or other instruction components. Processor(s) 132a may be similar to processor(s) 132 as described elsewhere in this disclosure, though included in client computing platforms 104, as depicted in FIG. 1. Machine-readable instructions 106a may be similar to machine-readable instructions 106 as described elsewhere in this disclosure, though included in client computing platforms 104, as depicted in FIG. 1. Electronic storage 130a (also referred to as local electronic storage 130a) may be similar to electronic storage 130 as described elsewhere in this disclosure, though included in client computing platforms 104, as depicted in FIG. 1.

Request component 108 may be configured to receive requests from client computing platforms 104, including but not limited to user-initiated requests. In some implementations, requests may be received via a communications network, including but not limited to one or more networks 13. In some implementations, a user-initiated request may be a request for one or more webpages. In some implementations, a user-initiated request may be received at a network location that corresponds to one or more webpages. For example, a network location may have a web address, a Uniform Resource Locator (URL), a Uniform Resource Identifier (URI), a Uniform Resource Name (URN), and/or another identifier or location information. In some implementations, a user-initiated request may be a HyperText Transfer Protocol (HTTP) request. In some implementations, a user-initiated request may be sent through a browsing application executing on a particular client computing platform 104. Webpages may include displayable content, including but not limited to textual information, audio information, image information, video information, animated information, and/or other information capable of being presented to a user of a client computing platform.

Transfer component 110 may be configured to transfer information to client computing platforms 104, e.g., in response to requests from client computing platforms 104. The transferred information may be a set of information that includes one or more subsets of information and/or content (e.g., executable code such as JavaScript code, Hypertext Markup Language (HTML) code, etc.). In some implementations, the transferred information may be useable to generate one or more presentations of one or more webpages on one or more client computing platforms 104. In some implementations, the multiple subsets may be configured to be used in order, e.g., in a particular sequence.

In some implementations, a first subset of information and/or content as transferred may be usable to generate and/or present a particular presentation on one or more client computing platforms 104. For example, a first presentation may be configured to collect one or more items of user-provided information (e.g., user-entered information), including but not limited to personal information pertaining to the user. For example, personal information may include user identifiers that identify users, such as, e.g., a name, tag, handle, or alias. In some implementations, the user identifiers may include a particular user identifier through which a particular user can receive notifications. For example, such a particular user identifier could include one or more of a phone number, an email address, a user account address, a social security number (SSN), a (residential) home address, a mailing address, an internet protocol (IP) address, a media access control (MAC) address, and/or other information that can be used (in some cases indirectly, by using a suitable database that connects this information to a person) to contact the particular user. Items of user-provided information may be collected and/or otherwise gathered through user input in a particular presentation. For example, a presentation (e.g., of a user interface) may include a form and/or a field for a user to enter user input, the user input representing user-entered information. In some implementations, a user interface may include one or more frames, borders, page sections, buttons, and/or other elements. The first subset of information and/or content may be configured to store information locally, in local electronic storage 130a of a particular client computing platform 104. The stored information may be (based on) the collected one or more items of user-provided information. In some implementations, a local browser application may manage local storage. For example, a first item of user-provided personal information may be stored by the local browser application in local electronic storage 130a (e.g., in a file or other document).

In some implementations, a second subset of information and/or content as transferred may be usable to generate and/or present a second particular presentation on one or more client computing platforms 104. For example, a second presentation may be configured to collect one or more items of user-provided information, including but not limited to personal information pertaining to the user (e.g., entered by the user in a form or a field of a user interface). The second subset may be configured to store information locally, in local electronic storage 130a of a particular client computing platform 104. The stored information may be (based on) the collected items of user-provided information. In some implementations, a second item of user-provided personal information may be stored by the local browser application in local electronic storage 130a (e.g., in a different file or appended to the same file as previously used for one or more other collected items). In some implementations, the second presentation may be presented after or subsequent to the first presentation. For example, the second presentation may be presented after the user provides the first item of user-provided information. For example, the second presentation may be presented after the user performs a particular action (e.g., clicking on a button). In some implementations, the transferred information may include other subsets of information useable to collect items of user-provided information, including but not limited to a third, a fourth, a fifth subset, and so forth.

In some implementations, a third subset of information and/or content as transferred may be usable to generate and/or present a third particular presentation on one or more client computing platforms 104. For example, a third presentation may be configured to collect information, including but not limited to information indicating (user-provided) permission from the user to transfer one or more items of user-provided (personal) information to one or more servers 102. For example, the third presentation may be configured to detect a user-initiated event, including but not limited to an event in a user interface that indicates (user-provided) permission from the user to transfer one or more items of user-provided (personal) information to one or more servers 102. For example, the user-initiated event may be the user clicking on a button labelled "SUBMIT", which would indicate permission for the transfer. In some implementations, the third presentation may be presented subsequent to the first presentation collecting a first item of user-provided information. In some implementations, the third presentation may be presented subsequent to the first presentation collecting a first item of user-provided information and the second presentation collecting a second item of user-provided information.

In some implementations, a fourth subset of information and/or content as transferred to a local client computing platform 104 may include locally executable content configured to initiate one or more transfers of user-provided information, from the local client computing platform 104 to one or more servers 102. The user-provided information may be based on the first item of user-provided personal information, the second item of user-provided personal information, and/or other items of user-provided information. Initiating the one or more transfers may occur responsive to the user providing permission for the transfer. Transferring the user-provided information may include accessing and/or otherwise retrieving information previously stored in local electronic storage 130a. In some implementations, the one or more transfers may use one or more asynchronous HyperText Transfer Protocol (HTTP) instructions that do not require a response from the destination (i.e., one or more servers 102). In some implementations, the one or more transfers may use a web beacon. In some implementations, the one or more asynchronous HyperText Transfer Protocol (HTTP) instructions may comply with the Beacon Application Programming Interface (API) standard as published by the world Wide Web Consortium.

Figure 4A:
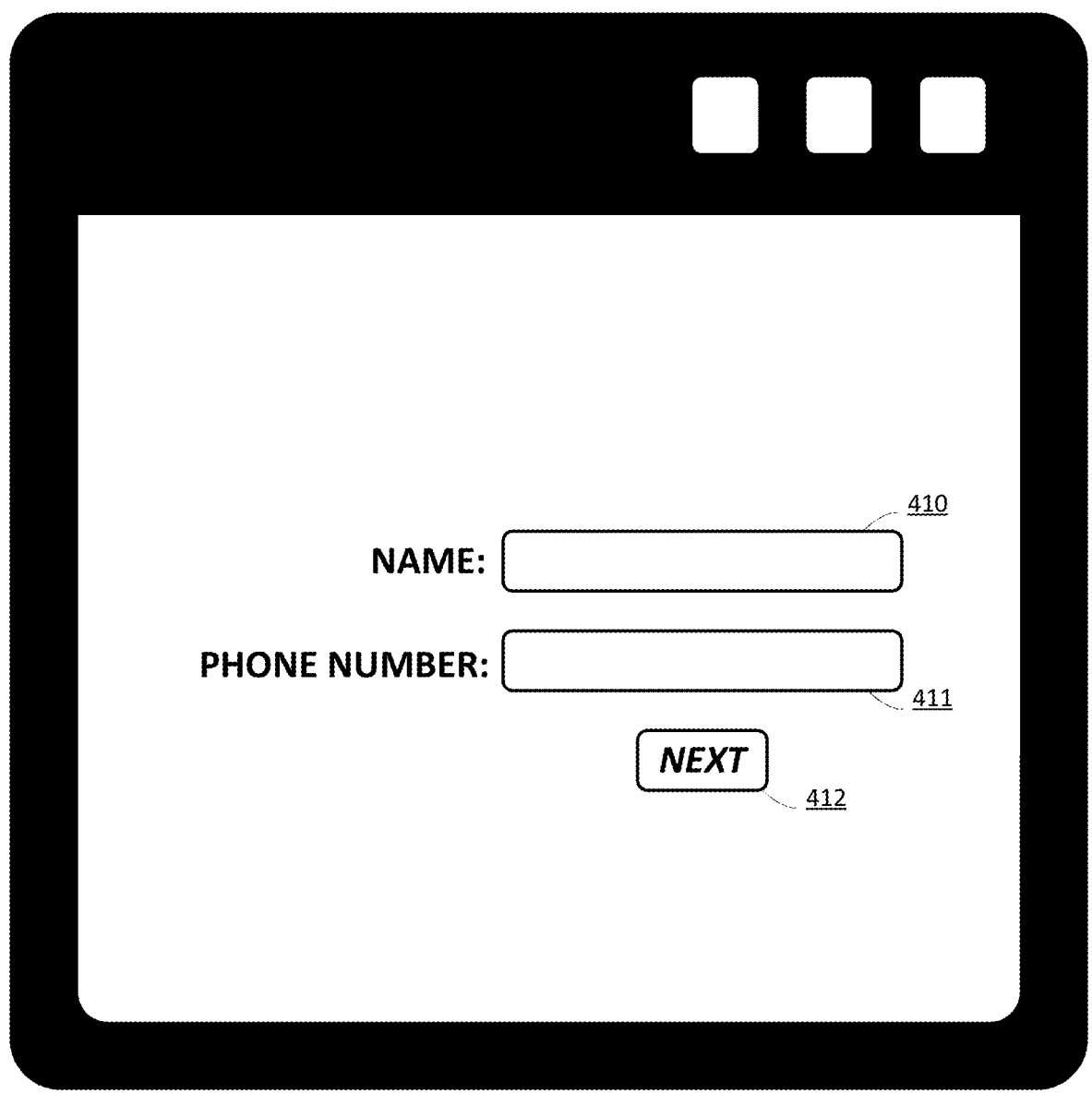
FIGS. 4A-4B illustrate examples of user interfaces, as may be used by a system configured to asynchronously transfer user-provided information upon user-provided permissions, in accordance with one or more implementations.
Figure 4B:
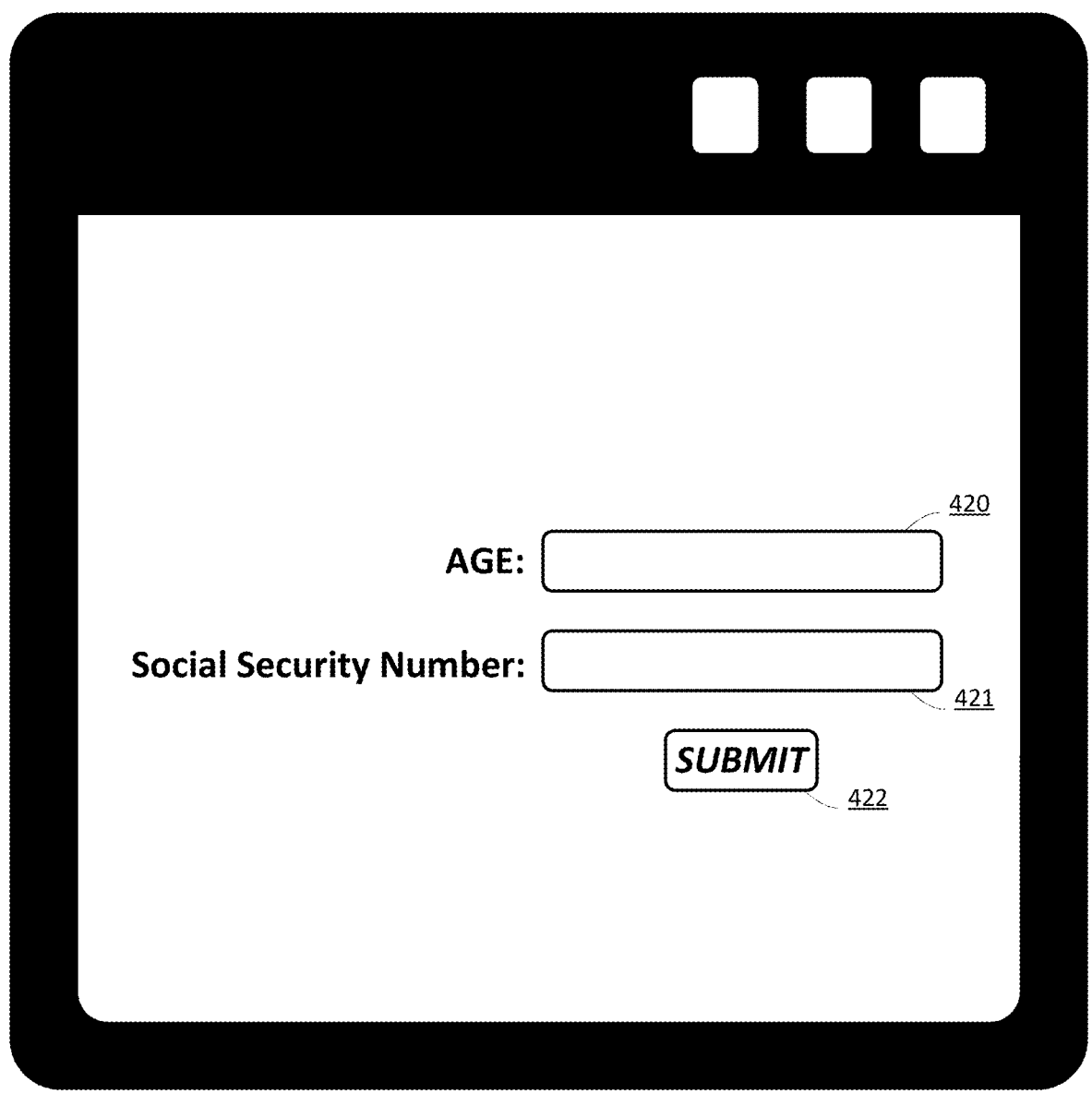

By way of non-limiting example, FIG. 4A illustrates a user interface 401, as may be used during operation of system 100. User interface 401 may be presented on a local client computing platform 104 as a first presentation of a particular webpage (subsequent to a user requesting the particular webpage through, e.g., a browser application executing on the local client computing platform 104). User interface 401 may be configured to collect (personal) information from the user. User interface 401 includes various graphical user interface elements, including a field 410 (labeled "NAME:"), a field 411 (labeled "PHONE NUMBER:"), and an action button 412 (labeled "NEXT"). Field 410 and field 411 are configured for a user to enter information, i.e., user-provided (personal) information pertaining to the user. In some implementations, upon entry of any information, user interface 401 may be configured to store the information locally, in local electronic storage 130a (not depicted). At this moment, no transfer to any servers has been initiated yet. In some implementations, user interface 401 may be configured to store the information locally, in local electronic storage 130a (not depicted), responsive to the user engaging action button 412 (e.g., by clicking on "NEXT"). Likewise, at this moment, no transfer to any servers has been initiated yet. Alternatively, and/or simultaneously, upon the user engaging action button 412, the browser application executing on the local client computing platform 104 may present a user interface 402 depicted in FIG. 4B. By way of non-limiting example, FIG. 4B illustrates user interface 402, as may be used during operation of system 100. User interface 401 may be configured to collect (personal) information from the user. User interface 402 includes various graphical user interface elements, including a field 420 (labeled "AGE:"), a field 421 (labeled "Social Security Number"), and an action button 422 (labeled "SUBMIT"). Field 420 and field 421 may be considered a particular presentation (i.e., the second presentation as described elsewhere herein). Action button 422 may be considered a separate presentation (i.e., the third presentation as described elsewhere herein). As depicted, the second and third presentation may be presented together, or even at the same time. In other implementations, the third presentation may be separated in time from the second presentation. Field 420 and field 421 are configured for a user to enter information, i.e., user-provided (personal) information pertaining to the user. In some implementations, upon entry of any information in user interface 402, user interface 402 may be configured to store the information locally, in local electronic storage 130a (not depicted). Responsive to the user engaging action button 422 (e.g., by clicking on "SUBMIT"), user interface 402 may be configured to initiate one or more transfers of user-provided information (e.g., as previously collected by user interface 401 and user interface 402, and as retrieved from local electronic storage 130a) to one or more servers 102 (not depicted). In some implementations, the presentation of user interface 401 may be configured to forestall and/or otherwise delay the presentation of user interface 402 until a particular occurrence (e.g., entry of a particular item of personal information, the use of a particular graphical user interface element such as a "NEXT" button, and/or other occurrences). In some implementations, the second presentation is not presented until the first item of user-provided information has been collected by the first presentation. For example, presenting the second presentation may remove, hide, and/or otherwise obscure the first presentation (e.g., by overlaying the second presentation onto the first presentation).

User-info component 112 may be configured to receive information from one or more client computing platforms 104, e.g., via a communications network. For example, the information received by user-info component 112 may be the information transferred by the one or more transfers as initiated by a particular subset of information and/or content (such as the fourth subset described above). In some implementations, the received information includes information regarding the user-provided permission for the one or more transfers. For example, the received information may include a timestamp and/or other information pertaining to the user-initiated event as detected by the third presentation, as described above.

Interface component 114 may be configured to transmit user-initiated requests from one or more client computing platforms 104, via a communications network, to one or more servers 102. An individual user-initiated request may request one or more webpages. In some implementations, interface component 114 may be configured to receive a set of information and/or content (particularly, in response to a user-initiated request). For example, the set of information may be usable to generate presentations of the one or more webpages on client computing platform 104. For example, the set of information may include subsets of content usable to generate and/or present presentations as described elsewhere in this disclosure.

Presentation component 116 may be configured to generate and/or present presentations. For example, a particular presentation may be based on information received by interface component 114. Presentations may include one or more user interfaces, e.g., interfaces 125. For example, a particular presentation may collect one or more items of user-provided (personal) information pertaining to a user. In some implementations, presentation component 116 may be configured to store information locally, in local electronic storage 130a. For example, the stored information may include the user-provided information as collected through a user interface.

Permission component 118 may be configured to detect events and/or collect information. For example, permission component 118 may detect a user-initiated event, including but not limited to an event in a user interface that indicates (user-provided) permission from the user to transfer one or more items of user-provided (personal) information to one or more servers 102. For example, permission component 118 may collect information indicating (user-provided) permission from the user to transfer one or more items of user-provided (personal) information to one or more servers 102. Permission component 118 may be configured to initiate one or more transfers of user-provided information to one or more servers 102 (e.g., subsequent to a user providing permission for a transfer).

Information regarding permissions may be stored, e.g., in electronic storage 130 and/or in other types of storage. In some implementations, a storage component may be configured to store and/or retrieve information in electronic storage, including but not limited to electronic storage 130. For example, certain permissions may be organized in database 130x for future access. Database 130x (which may, for example, be part of electronic storage 130) may be queried for the current status of a particular user's permissions. In some cases, database 130x may be queried (by way of non-limiting example, by permission component 118) for an overview of certain permissions pertaining to a particular user.

In some implementations, permission component 118 may be configured to use locally stored information (e.g., as collected using a particular webpage) to populate fields and/or forms in a presentation of a different webpage. For example, the permission provided by the user may be construed to allow future local use in populating different fields and/or forms for different webpages. In some implementations, permission component 118 may be configured to use information stored on the server-side (e.g., as received previously from a client computing platform 104) to populate fields and/or forms in a presentation of a particular webpage (even if the user has not used the particular webpage before). For example, the permission previously provided by the user may be construed to allow future use in populating different fields and/or forms for particular webpages.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100, and/or vice versa. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100.

Referring to FIG. 1, in some implementations, server(s) 102, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, individual client computing platforms 104 may be configured to determine geolocation information for a current location of the individual client computing platforms 104. For example, an individual client computing platform 104 may include a geolocation sensor (e.g., a Global Positioning System or GPS device). The geolocation sensor may be configured to generate output signals conveying GPS information (e.g., a set or range of GPS coordinates) and/or other geolocation information, which may be used by the individual client computing platform 104 to determine the current location of the individual client computing platform 104.

External resources 138 may include sources of information outside of system 100, external entities participating with system 100 (including third parties such as external web-servers for different organizations), external providers of computation and/or storage services (e.g., a publicly accessible server external to system 100), and/or other resources. In some implementations, external resources 138 may include one or more online service providers configured to notify a particular set of users, e.g., on behalf of a particular set of organizations. In some implementations, some or all of the functionality attributed herein to external resources 138 may be provided by resources included in system 100.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein. Local electronic storage 130a may be similar to electronic storage 130 as described elsewhere in this disclosure.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, and/or 118, and/or other components. Processor(s) 132 may be configured to execute components 108, 110, 112, 114, 116, and/or 118, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, in implementations in which processor(s) 132 includes multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes only, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 132 may be configured to execute one or more additional components that may perform some or all of the functionality attributed below to one of components 108, 110, 112, 114, 116, and/or 118.

Figure 2:
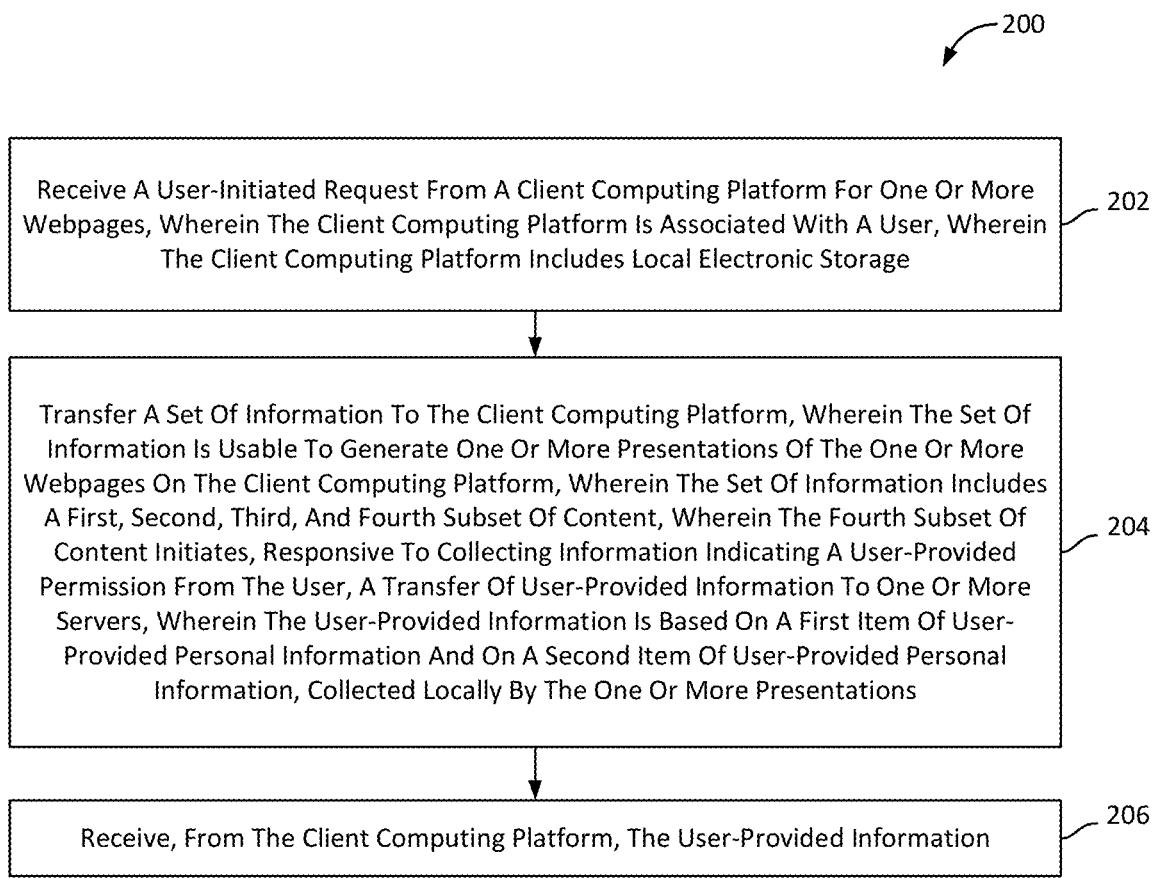
FIG. 2 illustrates a method of asynchronously transferring user-provided information upon user-provided permissions, in accordance with one or more implementations.
Figure 3:
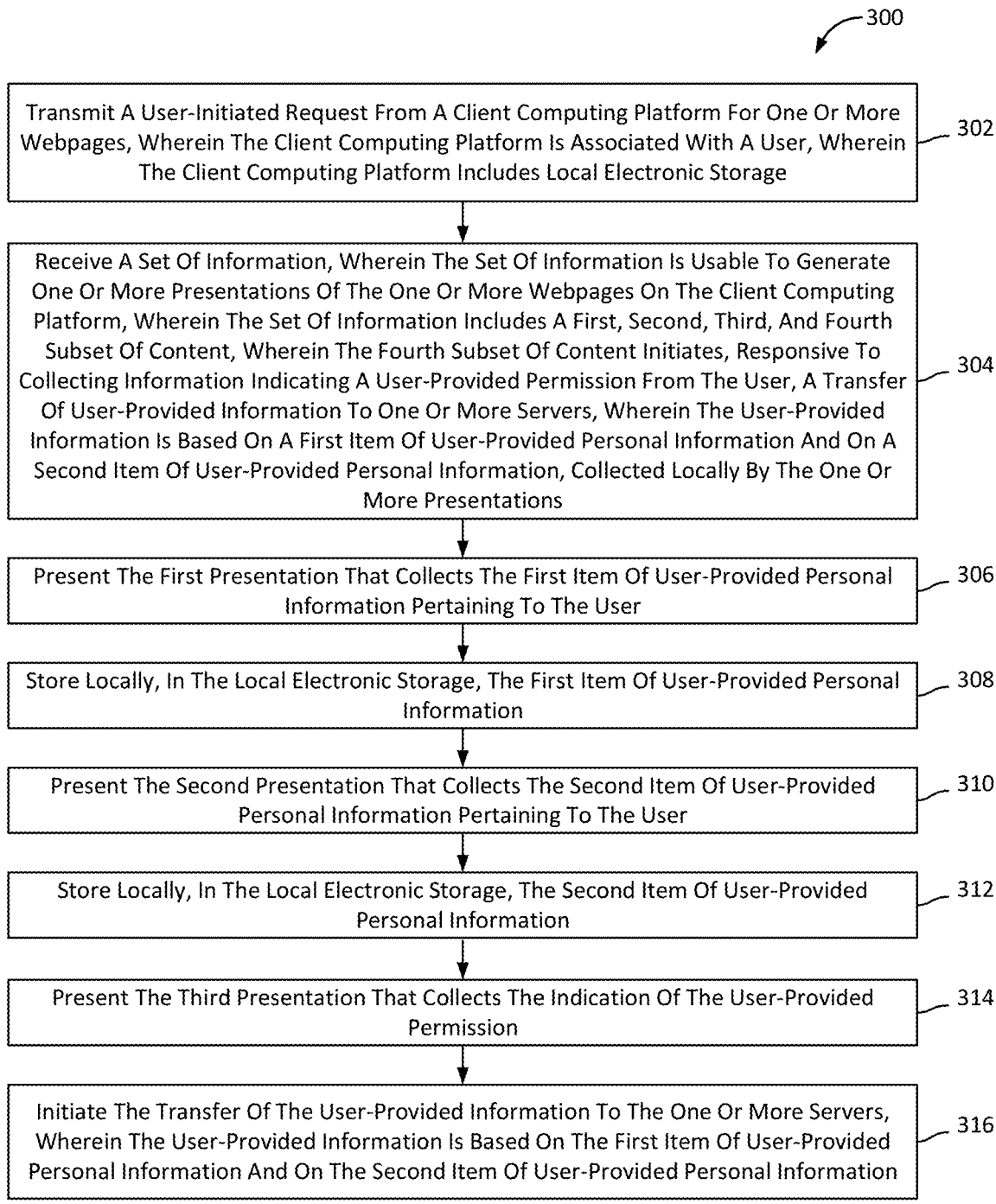
FIG. 3 illustrates a method of asynchronously transferring user-provided information upon user-provided permissions, in accordance with one or more implementations.

FIG. 2 and FIG. 3 illustrate a method 200 and a method 300, respectively, of asynchronously transferring user-provided information upon user-provided permissions, in accordance with one or more implementations. The operations of method 200 and method 300 presented below are intended to be illustrative. In some implementations, method 200 and/or method 300 may be accomplished with one or more additional operations not described, and/or without one or more of the operations discussed. Additionally, the order in which the operations of method 200 are illustrated in FIG. 2 and the operations of method 300 are illustrated in FIG. 3 and described below is not intended to be limiting.

In some implementations, method 200 and/or method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 and method 300 in response to instructions stored electronically on an electronic storage medium. The one or more processing devices may include one or more devices configured through hardware, firmware, and/or software to be specifically designed for execution of one or more of the operations of method 200 and method 300.

Regarding method 200, at an operation 202, a user-initiated request is received, via a communications network, from a client computing platform for one or more webpages. The client computing platform is associated with a user. The client computing platform includes local electronic storage that electronically stores information. In some embodiments, operation 202 is performed by a request component the same as or similar to request component 108 (shown in FIG. 1 and described herein).

At an operation 204, responsive to receipt of the user-initiated request, a set of information is transferred to the client computing platform. The set of information is usable to generate one or more presentations of the one or more webpages on the client computing platform. The set of information includes four subsets of content. A first subset of content is usable to generate and/or present a first presentation on the client computing platform. The first presentation collects a first item of user-provided personal information pertaining to the user. The first subset of content stores locally, in the local electronic storage, the first item of user-provided personal information. The second subset of content is usable to generate and/or present a second presentation on the client computing platform subsequent to the first presentation collecting the first item of user-provided personal information pertaining to the user. The second presentation collects a second item of user-provided personal information pertaining to the user. The second subset of content stores locally, in the local electronic storage, the second item of user-provided personal information. The third subset of content is usable to generate and/or present a third presentation on the client computing platform subsequent to the first presentation collecting the first item of user-provided personal information pertaining to the user. The third presentation collects an indication of a user-provided permission from the user to transfer the first item of user-provided personal information and the second item of user-provided personal information to the one or more servers. The fourth subset of content is usable to execute on the client computing platform. The fourth subset of content initiates, responsive to collecting the information indicating the user-provided permission from the user, a transfer of user-provided information to the one or more servers. The user-provided information is based on the first item of user-provided personal information and on the second item of user-provided personal information. In some embodiments, operation 204 is performed by a transfer component the same as or similar to transfer component 110 (shown in FIG. 1 and described herein).

At an operation 206, the user-provided information is received (at server-side) from the client computing platform, via the communications network. In some embodiments, operation 206 is performed by a user-info component the same as or similar to user-info component 112 (shown in FIG. 1 and described herein).

Regarding method 300 of FIG. 3, at an operation 302, a user-initiated request is transmitted, via a communications network, from a client computing platform for one or more webpages. The client computing platform is associated with a user. The client computing platform includes local electronic storage configured to electronically store information. In some embodiments, operation 302 is performed by an interface component the same as or similar to interface component 114 (shown in FIG. 1 and described herein).

At an operation 304, a set of information is received. The set of information is usable to generate one or more presentations of the one or more webpages on the client computing platform. The set of information includes (i) a first subset of content usable to generate and/or present a first presentation on the client computing platform. The first presentation collects a first item of user-provided personal information pertaining to the user. The first subset of content stores locally, in the local electronic storage, the first item of user-provided personal information, (ii) a second subset of content usable to generate and/or present a second presentation on the client computing platform subsequent to the first presentation collecting the first item of user-provided personal information pertaining to the user. The second presentation collects a second item of user-provided personal information pertaining to the user. The second subset of content stores locally, in the local electronic storage, the second item of user-provided personal information, (iii) a third subset of content usable to generate and/or present a third presentation on the client computing platform subsequent to the first presentation collecting the first item of user-provided personal information pertaining to the user. The third presentation collects an indication of a user-provided permission from the user to transfer the first item of user-provided personal information and the second item of user-provided personal information to one or more servers, and (iv) a fourth subset of content usable to execute on the client computing platform. The fourth subset of content initiates, responsive to collecting the information indicating the user-provided permission from the user, a transfer of the user-provided information to the one or more servers. The user-provided information is based on the first item of user-provided personal information and on the second item of user-provided personal information. In some embodiments, operation 304 is performed by an interface component the same as or similar to interface component 114 (shown in FIG. 1 and described herein).

At an operation 306, the first presentation is presented that collects the first item of user-provided personal information pertaining to the user. In some embodiments, operation 306 is performed by a presentation component the same as or similar to presentation component 116 (shown in FIG. 1 and described herein).

At an operation 308, the first item of user-provided personal information is stored locally, in the local electronic storage. In some embodiments, operation 308 is performed by a presentation component the same as or similar to presentation component 116 (shown in FIG. 1 and described herein).

At an operation 310, the second presentation is presented that collects the second item of user-provided personal information pertaining to the user. In some embodiments, operation 310 is performed by a presentation component the same as or similar to presentation component 116 (shown in FIG. 1 and described herein).

At an operation 312, the second item of user-provided personal information is stored locally, in the local electronic storage. In some embodiments, operation 312 is performed by a presentation component the same as or similar to presentation component 116 (shown in FIG. 1 and described herein).

At an operation 314, the third presentation is presented that collects the indication of the user-provided permission. In some embodiments, operation 314 is performed by a permission component the same as or similar to permission component 118 (shown in FIG. 1 and described herein).

At an operation 316, the transfer of the user-provided information to the one or more servers is initiated. The user-provided information is based on the first item of user-provided personal information and on the second item of user-provided personal information. In some embodiments, operation 316 is performed by a permission component and/or an interface component the same as or similar to permission component 118 and/or interface component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to asynchronously transfer user-provided information upon user-provided permissions, the system comprising:
one or more servers including one or more processors configured by machine-readable instructions to:
receive, via a communications network, a user-initiated request from a client computing platform for one or more webpages, wherein the client computing platform is associated with a user, wherein the client computing platform includes local electronic storage configured to electronically store information;
responsive to receipt of the user-initiated request, transfer a set of information to the client computing platform, wherein the set of information is usable to generate one or more presentations of the one or more webpages on the client computing platform, wherein the set of information includes:
(i) a first subset of content usable to generate and/or present a first presentation on the client computing platform, wherein the first presentation is configured to collect a first item of user-provided personal information pertaining to the user, and wherein the first subset of content is configured to store locally, in the local electronic storage, the first item of user-provided personal information;
(ii) a second subset of content usable to generate and/or present a second presentation on the client computing platform subsequent to the first presentation collecting the first item of user-provided personal information pertaining to the user, wherein the second presentation is configured to collect a second item of user-provided personal information pertaining to the user, and wherein the second subset of content is configured to store locally, in the local electronic storage, the second item of user-provided personal information;
(iii) a third subset of content usable to generate and/or present a third presentation on the client computing platform subsequent to the first presentation collecting the first item of user-provided personal information pertaining to the user, wherein the third presentation is configured to collect information indicating a user-provided permission from the user to transfer the first item of user-provided personal information and the second item of user-provided personal information to the one or more servers; and
(iv) a fourth subset of content usable to execute on the client computing platform, wherein the fourth subset of content is configured to, responsive to collecting the information indicating the user-provided permission from the user, initiate a transfer of user-provided information to the one or more servers, wherein the user-provided information is based on the first item of user-provided personal information and on the second item of user-provided personal information; and
receive, from the client computing platform and via the communications network, the user-provided information.

2. The system of claim 1, wherein the set of information includes executable content configured to be executed by the client computing platform through one or more browser applications.

3. The system of claim 1, wherein the user-initiated request is received at a network location corresponding to the one or more webpages.

4. The system of claim 1, wherein the user-initiated request is a HyperText Transfer Protocol (HTTP) request sent through a browsing application executing on the client computing platform.

5. The system of claim 1, wherein the first presentation includes a first form with a first field configured for entry of the first item of user-provided personal information pertaining to the user, and wherein the second presentation includes a second form with a second field configured for entry of the second item of user-provided personal information pertaining to the user.

6. The system of claim 1, wherein the transfer is initiated using an asynchronous HyperText Transfer Protocol (HTTP) instruction that does not require a response from the one or more servers.

7. The system of claim 1, wherein the first presentation is configured to detect a first action by the user, and wherein responsive to detection of the first action, the second presentation is presented.

8. The system of claim 1, wherein initiation of the transfer includes accessing and/or retrieving the first item of user-provided personal information and the second item of user-provided personal information from the local electronic storage included in the client computing platform.

9. The system of claim 1, wherein the set of information further includes a fifth subset of content usable to generate a particular presentation on the client computing platform, wherein the particular presentation is configured to collect an additional item of personal information pertaining to the user, wherein the fifth subset of content is configured to store locally, in the local electronic storage, the additional item of personal information, and wherein the user-provided information is further based on the additional item of personal information as retrieved from the local electronic storage.

10. The system of claim 1, wherein the third presentation is presented simultaneously with the second presentation, and wherein the third presentation includes an interactive graphical user interface element.

11. A method of asynchronously transferring user-provided information upon user-provided permissions, the method comprising:
receiving, via a communications network, a user-initiated request from a client computing platform for one or more webpages, wherein the client computing platform is associated with a user, wherein the client computing platform includes local electronic storage that electronically stores information;
responsive to receipt of the user-initiated request, transferring a set of information to the client computing platform, wherein the set of information is usable to generate one or more presentations of the one or more webpages on the client computing platform, wherein the set of information includes:
(i) a first subset of content usable to generate and/or present a first presentation on the client computing platform, wherein the first presentation collects a first item of user-provided personal information pertaining to the user, and wherein the first subset of content stores locally, in the local electronic storage, the first item of user-provided personal information,
(ii) a second subset of content usable to generate and/or present a second presentation on the client computing platform subsequent to the first presentation collecting the first item of user-provided personal information pertaining to the user, wherein the second presentation collects a second item of user-provided personal information pertaining to the user, and wherein the second subset of content stores locally, in the local electronic storage, the second item of user-provided personal information, (iii) a third subset of content usable to generate and/or present a third presentation on the client computing platform subsequent to the first presentation collecting the first item of user-provided personal information pertaining to the user, wherein the third presentation collects an indication of a user-provided permission from the user to transfer the first item of user-provided personal information and the second item of user-provided personal information to one or more servers, and (iv) a fourth subset of content usable to execute on the client computing platform, wherein the fourth subset of content initiates, responsive to collecting the information indicating the user-provided permission from the user, a transfer of user-provided information to the one or more servers, wherein the user-provided information is based on the first item of user-provided personal information and on the second item of user-provided personal information; and receiving, from the client computing platform and via the communications network, the user-provided information.

12. The method of claim 11, wherein the set of information includes executable content that is executable by the client computing platform through one or more browser applications.

13. The method of claim 11, wherein the user-initiated request is received at a network location corresponding to the one or more webpages, and wherein the user-initiated request is a HyperText Transfer Protocol (HTTP) request sent through a browsing application executing on the client computing platform.

14. The method of claim 11, wherein the first item of user-provided personal information pertaining to the user is personally identifiable information (PII) including one or more of a name of the user, an email address of the user, and/or a phone number of the user.

15. The method of claim 11, wherein the first presentation includes a first form with a first field to enter the first item of user-provided personal information pertaining to the user, and wherein the second presentation includes a second form with a second field to enter the second item of user-provided personal information pertaining to the user.

16. The method of claim 11, wherein the transfer is initiated using an asynchronous HyperText Transfer Protocol (HTTP) instruction that does not require a response from the one or more servers.

17. The method of claim 11, wherein the first presentation detects a first action by the user, and wherein responsive to detection of the first action, the second presentation is presented.

18. The method of claim 11, wherein initiation of the transfer includes accessing and/or retrieving the first item of user-provided personal information and the second item of user-provided personal information from the local electronic storage included in the client computing platform.

19. The method of claim 11, wherein the set of information further includes a fifth subset of content usable to generate a particular presentation on the client computing platform, wherein the particular presentation collects an additional item of personal information pertaining to the user, wherein the fifth subset of content stores locally, in the local electronic storage, the additional item of personal information, and wherein the user-provided information is further based on the additional item of personal information as retrieved from the local electronic storage.

20. A method of asynchronously transferring user-provided information upon user-provided permissions, the method comprising:

transmitting, via a communications network, a user-initiated request from a client computing platform for one or more webpages, wherein the client computing platform is associated with a user, wherein the client computing platform includes local electronic storage configured to electronically store information;

receiving a set of information, wherein the set of information is usable to generate one or more presentations of the one or more webpages on the client computing platform, wherein the set of information includes (i) a first subset of content usable to generate and/or present a first presentation on the client computing platform, wherein the first presentation collects a first item of user-provided personal information pertaining to the user, and wherein the first subset of content stores locally, in the local electronic storage, the first item of user-provided personal information, (ii) a second subset of content usable to generate and/or present a second presentation on the client computing platform subsequent to the first presentation collecting the first item of user-provided personal information pertaining to the user, wherein the second presentation collects a second item of user-provided personal information pertaining to the user, and wherein the second subset of content stores locally, in the local electronic storage, the second item of user-provided personal information, (iii) a third subset of content usable to generate and/or present a third presentation on the client computing platform subsequent to the first presentation collecting the first item of user-provided personal information pertaining to the user, wherein the third presentation collects an indication of a user-provided permission from the user to transfer the first item of user-provided personal information and the second item of user-provided personal information to one or more servers, and (iv) a fourth subset of content usable to execute on the client computing platform, wherein the fourth subset of content initiates, responsive to collecting the information indicating the user-provided permission from the user, a transfer of the user-provided information to the one or more servers, wherein the user-provided information is based on the first item of user-provided personal information and on the second item of user-provided personal information;

presenting the first presentation that collects the first item of user-provided personal information pertaining to the user;

storing locally, in the local electronic storage, the first item of user-provided personal information;

presenting the second presentation that collects the second item of user-provided personal information pertaining to the user;

storing locally, in the local electronic storage, the second item of user-provided personal information;

presenting the third presentation that collects the indication of the user-provided permission; and initiating the transfer of the user-provided information to the one or more servers, wherein the user-provided information is based on the first item of user-provided personal information and on the second item of user-provided personal information.

\* \* \* \* \*